US008276635B2

(12) United States Patent
Nijhuis

(10) Patent No.: US 8,276,635 B2
(45) Date of Patent: Oct. 2, 2012

(54) MACHINES AND METHODS FOR MANUFACTURING OF AN OBJECT CLOSED ONTO ITSELF

(75) Inventor: Erik Gerardus Nijhuis, BT Hengelo (NL)

(73) Assignee: VMI Epe Holland B.V., Epe (NL)

( * ) Notice: Subject to any disclaimer, the term of this patent is extended or adjusted under 35 U.S.C. 154(b) by 1075 days.

(21) Appl. No.: 11/792,661

(22) PCT Filed: Dec. 15, 2005

(86) PCT No.: PCT/NL2005/000865
§ 371 (c)(1),
(2), (4) Date: Feb. 5, 2008

(87) PCT Pub. No.: WO2006/065122
PCT Pub. Date: Jun. 22, 2006

(65) Prior Publication Data
US 2009/0038740 A1    Feb. 12, 2009

(30) Foreign Application Priority Data
Dec. 15, 2004    (NL) .................................... 1027749

(51) Int. Cl.
*B29D 30/10*    (2006.01)
(52) U.S. Cl. ........ 156/417; 156/134; 156/217; 156/218; 156/421.8; 156/460
(58) Field of Classification Search .................. 156/134, 156/217, 218, 417, 421.4, 421.8, 460
See application file for complete search history.

(56) References Cited

U.S. PATENT DOCUMENTS
3,909,337 A    9/1975 Yabe
(Continued)

FOREIGN PATENT DOCUMENTS
DE    24 20 329    11/1975
(Continued)

OTHER PUBLICATIONS
Patent Abstracts of Japan of JP 01 249429 Dated Oct. 4, 1989.
(Continued)

*Primary Examiner* — Khanh P Nguyen
*Assistant Examiner* — John Blades
(74) *Attorney, Agent, or Firm* — Ladas & Parry LLP

(57) ABSTRACT

The invention relates to a machine for manufacturing an object closed onto itself, which machine comprises first means for guiding and carrying a tire material to be arranged round the first means, characterized in that the first means can change form in controlled manner between a first form and a second form. The invention also relates to a machine for manufacturing an object closed onto itself, which machine comprises first means for guiding and supporting a tire material to be arranged round the first means, characterized in that the machine also comprises sixth means for folding the tire material arranged round the first means, for which purpose the sixth means comprise a number of folding members movable relative to each other, which folding members can engage on the tire material for folding and can therein move inside recesses provided for this purpose in the first means. The invention also relates to methods for manufacturing an object closed onto itself, comprising of arranging a tire material round first means provided for this purpose. Such machines and methods can be applied particularly in the production of tires for vehicles.

16 Claims, 4 Drawing Sheets

U.S. PATENT DOCUMENTS

| | | | |
|---|---|---|---|
| 3,976,532 A | | 8/1976 | Barefoot |
| 4,268,330 A | | 5/1981 | Komatsu et al. |
| 5,032,198 A | | 7/1991 | Kojima et al. |
| 5,073,226 A | * | 12/1991 | Suzuki et al. .......... 156/417 |

FOREIGN PATENT DOCUMENTS

| | | | |
|---|---|---|---|
| DE | 10 2004 008 273 | | 9/2005 |
| EP | 0 417 991 | | 3/1991 |
| EP | 1 197 317 | | 4/2002 |
| JP | 2003-071951 | * | 3/2003 |
| WO | 00/46018 | | 8/2000 |

OTHER PUBLICATIONS

Patent Abstracts of Japan of JP 08 281829 Dated Oct. 29, 1996.
Patent Abstracts of Japan of JP 07 080963 Dated Mar. 28, 1995.

* cited by examiner a.

b.

a.

b.

c.

MACHINES AND METHODS FOR MANUFACTURING OF AN OBJECT CLOSED ONTO ITSELF

FIELD OF THE INVENTION

The invention relates to machines for manufacturing an object closed onto itself, which machines comprise first means for guiding and carrying a tyre material to be arranged round the first means. The invention also relates to methods for manufacturing an object closed onto itself, comprising of arranging a tyre material round first means provided for this purpose. Such machines and methods can be applied particularly in the production of tyres for vehicles.

BACKGROUND OF THE INVENTION

Systems are known for manufacturing an object closed onto itself, such as a tyre for a vehicle. Tyre materials must herein always be severed at a determined length and welded, and then optionally folded and pressed together. Particularly in the case of tyres high standards are set for the quality of the welds and the pressing, and for the final form.

The object of the present invention is to provide an improved solution for the welding, folding, treating and processing of tyre materials to form an object closed onto itself.

SUMMARY OF THE INVENTION

The invention provides for this purpose a machine for manufacturing an object closed onto itself, which machine comprises first means for guiding and carrying a tyre material to be arranged round the first means, characterized in that the first means can change form in controlled manner between a first form and a second form. 'An object closed onto itself' is understood to mean 'an object without end', for instance an annular or cylindrical object such as a car or cycle tyre, although other forms are also possible. 'Tyre material' is understood to mean a material extending lengthwise, such as a strip or a ribbon, with a more or less constant cross-section of a determined form. The first means can thus be adapted to a desired form of the object for manufacturing. The tyre material or other objects can thus also be arranged more easily round the first means, or removed therefrom, by reducing the size of the first means, or conversely be tensioned by increasing the size of the first means.

The first form can herein have a substantially cylindrical periphery with a first diameter, and the second form a substantially cylindrical periphery with a second diameter differing from the first diameter. The first means can thus be adapted to a desired diameter of the object for manufacturing.

The first form preferably has a substantially cylindrical periphery and the second form a substantially cylindrical periphery with a flattened portion. A more or less flat supporting part can thus be temporarily created, to which can be welded outer ends of the tyre material, whereafter the first means can again for instance take on a cylinder form.

The first means preferably comprise a plurality of elements wherein the positions of the elements can be adjusted relative to each other such that an at least partial change takes place between the first and the second form. The elements are herein preferably rod-like and placed at determined mutual distances. The form can thus be readily changed without the replacement of components being necessary. Recesses are also created in the first means by placing the rod-like elements at determined mutual distances, which recesses can be useful in further processes, for instance in folding of the tyre material as described hereinbelow.

At least some of the elements are each preferably rotatable around their own axis. The tyre material arranged round the first means can then 'adapt' itself relative to the first means, for instance when the first means changes form, whereby tensile forces and stresses will be distributed more uniformly over the tyre material. The tyre material arranged round the first means can thus optionally also be moved integrally relative to the first means, for instance to carry out a determined process, for instance pressing together of a folded tyre material as described hereinbelow.

At least some of the elements can herein be articulated and/or provided with a hinge, which can facilitate the placing or removal of optionally welded tyre material or objects closed onto themselves.

The first means can also comprise a bellows, wherein the bellows can be filled and emptied such that an at least partial change takes place between the first and the second form. This can be advantageous in determined applications.

The machine preferably also comprises second means for holding and transporting the tyre material to the first means, and third means for holding the tyre material on the first means. The tyre material can thus be arranged round the first means, wherein the stresses in the arranged tyre material can be properly controlled.

The machine preferably also comprises fourth means for cutting the tyre material, and also fifth means for welding the tyre material. An object closed onto itself can thus be manufactured.

The invention also provides a machine for manufacturing an object closed onto itself, which machine comprises first means for guiding and supporting a tyre material to be arranged round the first means, characterized in that the machine also comprises sixth means for folding the tyre material arranged round the first means, for which purpose the sixth means comprise a number of folding members movable relative to each other, which folding members can engage on the tyre material for folding and can therein move inside recesses provided for this purpose in the first means. The tyre material arranged round the first means can thus be folded without having to be removed from the first means. This will be further explained in the following description of preferred embodiments of the invention.

The sixth means can herein also comprise pressing members for pressing together the folded tyre material. The edges of the folded tyre material can thus for instance be pressed against each other so as to thus bring about a good adhesion. This will also be explained further in the following description of preferred embodiments of the invention.

The machine preferably also comprises seventh means for displacing the first means from a first position, for instance for welding the tyre material, to a second position, for instance for folding the tyre material, and vice versa. The welded tyre material can thus be folded after the welding without having to be removed from the first means.

The machine can herein also comprise a second set of first means, which second set is conversely displaced from the second to the first position when the first means are displaced from the first position to the second position, and vice versa. The production rate can in principle thus be doubled, and the drive and the movements of the two sets of first means can also be at least partly combined, which results in advantages of design and production engineering and energy-related advantages. There may of course also be more than two sets of first means, which sets change position relative to each other in each case.

The invention also comprises methods for manufacturing an object closed onto itself, comprising of arranging a tyre material round first means provided for this purpose.

SHORT DESCRIPTION OF THE FIGURES

The invention is elucidated hereinbelow on the basis of non-limitative preferred embodiments of the invention.

For this purpose:

DESCRIPTION OF PREFERRED EMBODIMENTS OF THE INVENTION

Figure 1:
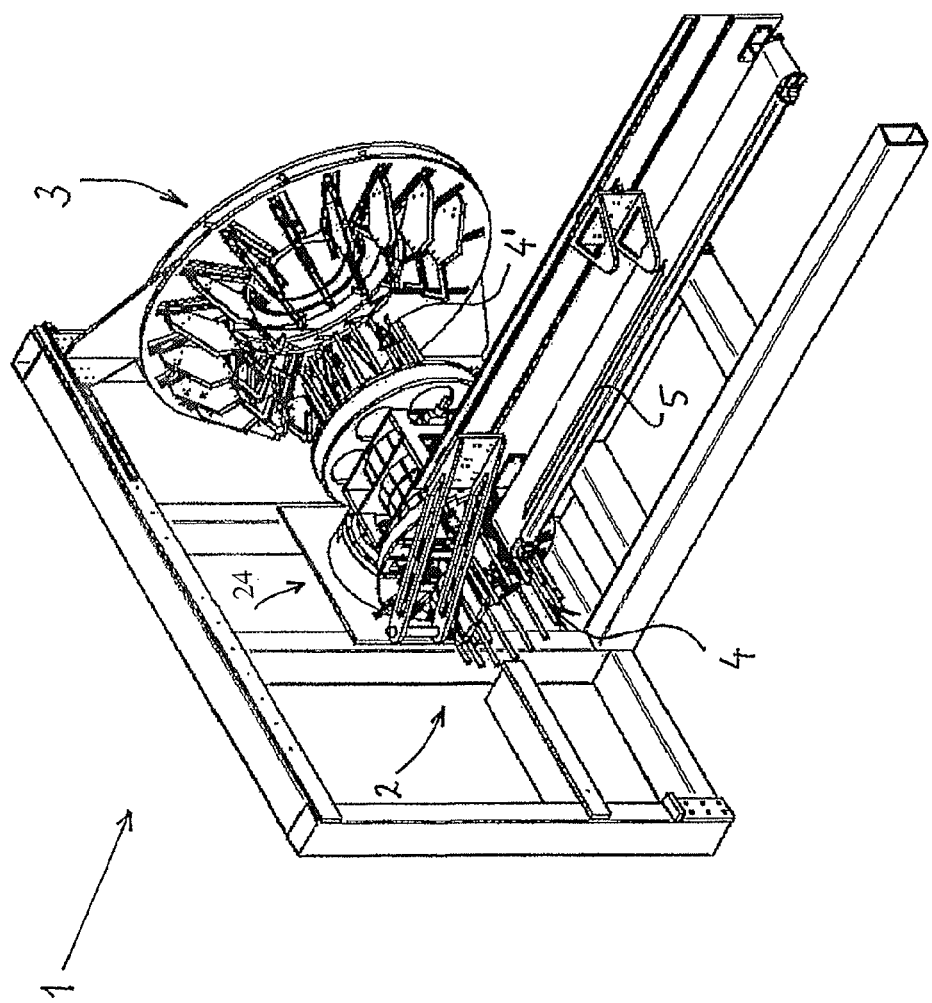
FIG. 1 shows a perspective view of a machine according to the invention.
Figure 2:
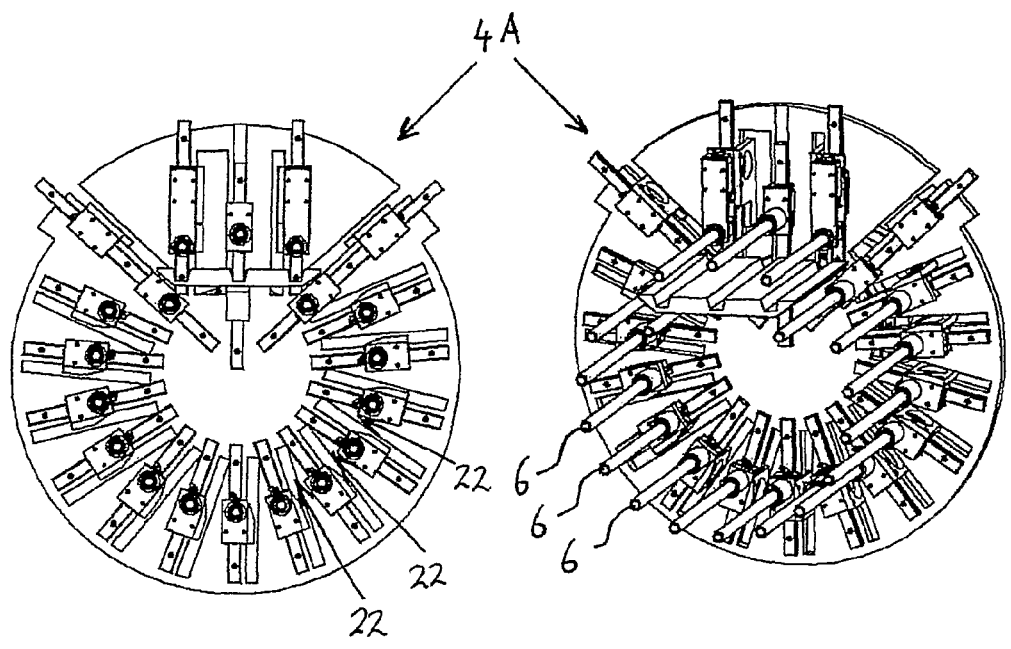
FIG. 2 shows front views and perspective views of first means for guiding and carrying tyre material according to the invention.
Figure 2:
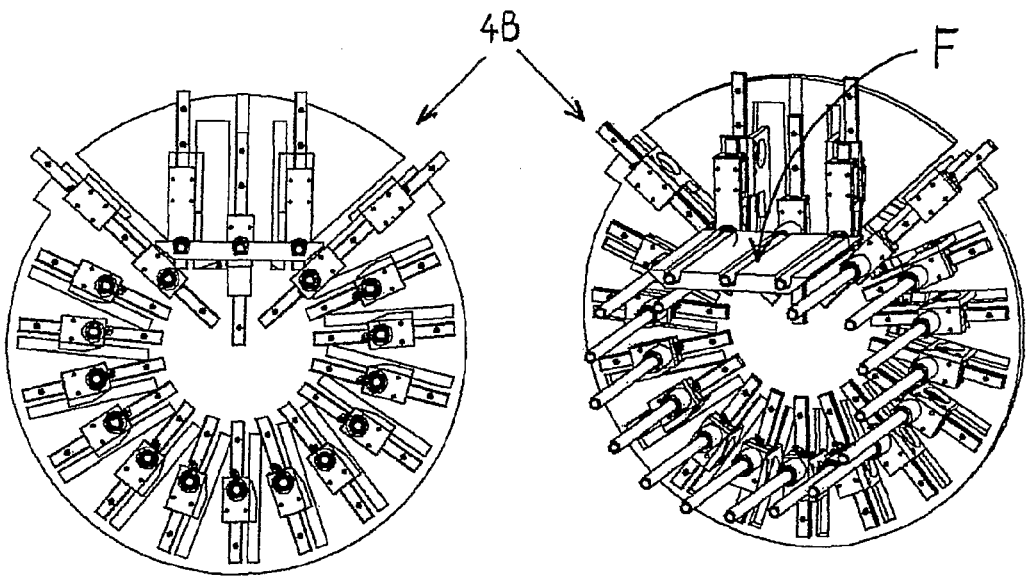

FIG. 1 shows a machine (1) according to the invention for manufacturing an object closed onto itself, in this embodiment a component of a car tyre. Machine (1) comprises a winding and welding part (2) and a folding part (3). Machine (1) comprises first means (4) which can change form in controlled manner between a cylinder form (4A) and a cylinder form (4B) with a flat portion (F), see FIG. 2. For this purpose the first means (4) are constructed from a plurality of radially adjustable fingers (6) which are placed at determined mutual distances. The diameter of cylinder forms (4A,4B) can also be changed by adjusting the fingers (6), for instance in order to prepare machine (1) for a different product, for instance a tyre of different dimensions. Fingers (6) are rotatable around their own axis.

A tyre material, in this embodiment a strip of semi-plastic rubber (5), is wound round the first means (4), wherein the first means (4) have been made to take on the cylinder form (4B) with the flat portion (F) by causing the first means (4) to rotate, wherein the strip part (5) is held by second means, for instance by applying an underpressure, and is transported to the first means (4). The flat portion (F) can be provided with third means for holding strip part (5) thereon, for instance by again applying an underpressure. Strip part (5) can thus be arranged round the first means (4), wherein the position of strip part (5) and the stresses in strip part (5) can be properly controlled.

Figure 3:
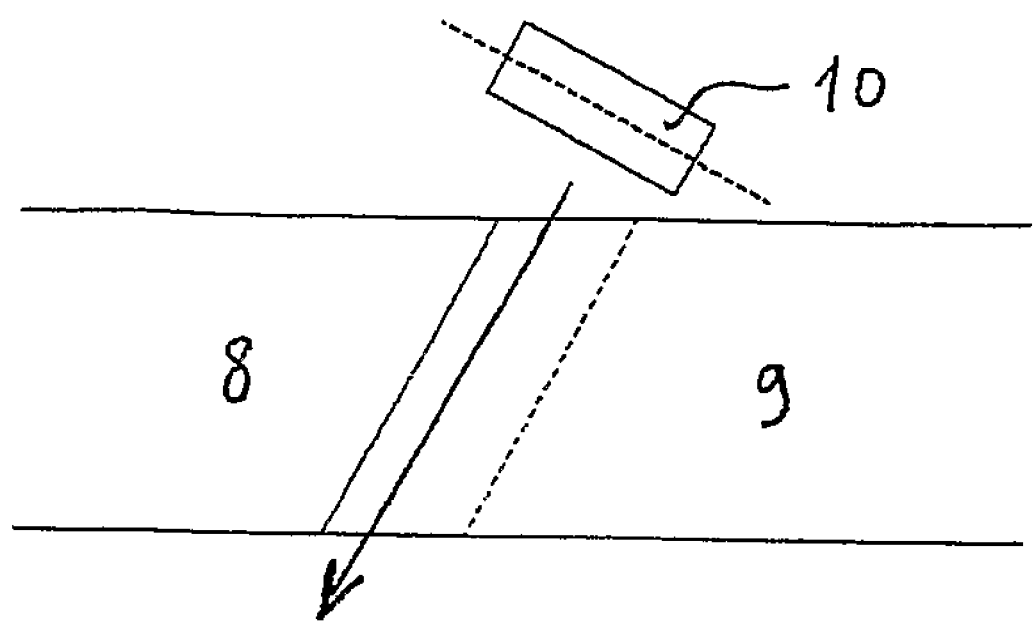
FIG. 3 shows the welding of a tyre material.

The winding and welding device (2) also comprises fourth means for severing one new strip part (5) at a time. When strip part (5) is wound round the first means (4), the outer ends thereof are held fast by the second means and optionally the third means. It is ensured that outer ends (8,9) come to lie on the flat portion (F), and there partly overlap each other as shown in FIG. 3.

Welding on a flat surface produces a better quality of weld than welding on a non-flat surface. This is particularly important in the case of a longer weld, such as the oblique weld in the given example. The tensile forces and tensile stresses will also be distributed uniformly over the strip part (5) because fingers (6) can rotate. The overlapping ends are subsequently welded using fifth means (10), for instance a roller.

After welding another tyre material, optionally already welded, can for instance be arranged round the welded rubber strip part (5), in this example an already welded assembly (11) of a 'heel' (11') and a 'filler strip' (11"). The form of the first means (4) can then be changed to the cylinder form (4A), wherein the welded strip part (5) and the possible other tyre material are tensioned to a greater or lesser extent. The tensile forces and stresses will here once again be distributed uniformly since fingers (6) can rotate.

It is then possible by means of seventh means (24) to displace the first means (4) with the welded strip part (5) and the optional other tyre material from the winding and welding part (2) to the folding part (3), without removing it from the first means (4). Here however a second set of first means (4') moves in opposite direction from folding part (3) to winding and welding part (2). The production rate can thus in principle be doubled, and the drive and the movements of the two sets of first means (4,4') can also be at least partly combined, which results in advantages of design and production engineering and energy-related advantages.

Figure 4:
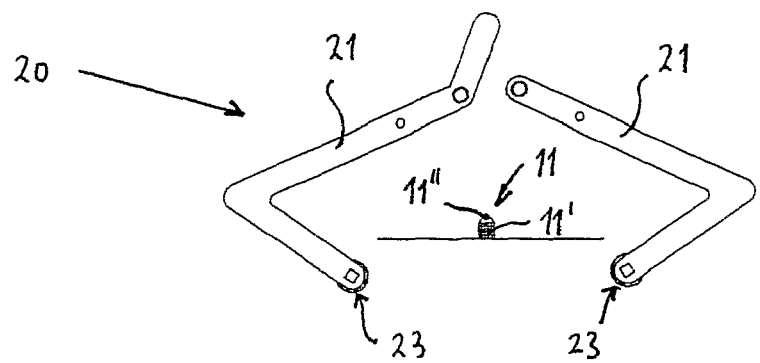
FIG. 4 shows the folding of a tyre material according to the invention.
Figure 4:
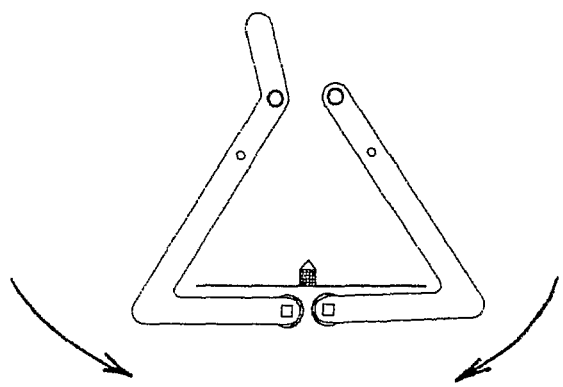
Figure 4:
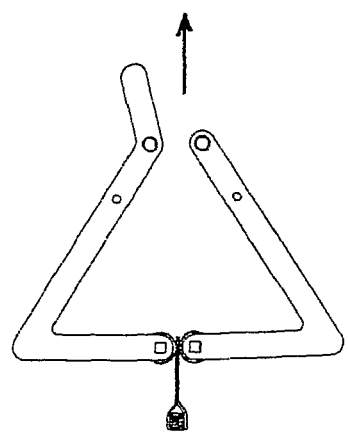

The welded strip part (5) is then folded by means of a series of sixth means (20) which each comprise a number of folding members (21) which are movable relative to each other, see FIG. 4, by having the folding members (21) engage on the edges of the strip part (5) for folding. The edges of the folded strip part (5) are then pressed against each other so as to thus bring about a good adhesion, for which purpose the sixth means (20) also comprise pressing members (23), in this embodiment rollers. Owing to the spaces between rod-like elements (6), which form recesses (22) in the first means (4'), folding members (21) and pressing members (23) can move inside these recesses (22). The edges can thus be folded and pressed together without having to remove them from the first means (4').

The whole of folded strip part (5), heel (11') and filler strip (11') can subsequently be rotated relative to the first means (4'), for instance by holding fixedly the assembly of folded strip part (5), heel (11') and filler strip (11') and rotating the first means (4'), or for instance by stopping the first means (4') and rotating fingers (6) about their own axis. The edges and the assembly can thus be well pressed together once more over the whole length, and the assembly can be arranged in even better manner in a desired, in this example round, form.

The assembly of folded strip part (5), heel (11') and filler strip (11') can then be pressed away from the first means (4') by means of a separator provided for the purpose, wherein the pressing members (23) once more press the edges well against each other in transverse direction and a final form is obtained with an 'oblique' cross-section which is desired in this embodiment. The assembly of separator with the welded and folded strip part (5), heel (11') and filler strip (11') thereon can then be further treated or processed.

Fingers (6) can optionally be articulated and/or provided with hinges, which can facilitate the placing or removal of optionally welded tyre material or objects closed onto themselves.

It will be apparent to a skilled person that the invention is by no means limited to the described preferred embodiments, but that many alternatives, variations and combinations are still possible within the scope of the invention. In addition to being used for the manufacture of tyres and components thereof, the system can of course also be used in the production of other objects closed onto themselves.

The invention claimed is:

1. Machine (1) for manufacturing a component of a car tyre, which machine comprises first means (4) for guiding and carrying a tyre material to be arranged round the first means, wherein the first means can change form in controlled manner between a first form and a second form, characterized in that the first form (4A) has a substantially cylindrical periphery and the second form (4B) a substantially cylindrical periphery with a flattened portion, characterized in that the first means comprise a plurality of radially adjustable elements (6) wherein the positions of the elements can be radially adjusted and adjusted relative to each other such that an at least partial change takes place between the first and the second form.

2. Machine as claimed in claim 1, characterized in that the elements are rod-like and placed at determined mutual distances.

3. Machine as claimed in claim 1, characterized in that at least some of the elements are articulated.

4. Machine as claimed in claim 1, characterized in that at least some of the elements are provided with a hinge.

5. Machine as claimed in claim 2, characterized in that at least some of the elements are each rotatable around their own axis.

6. Machine as claimed in claim 1, characterized in that the machine also comprises second means for holding and transporting the tyre material to the first means.

7. Machine as claimed in claim 1, characterized in that the machine also comprises third means for holding the tyre material on the first means.

8. Machine as claimed in claim 1, characterized in that the machine also comprises fourth means for cutting the tyre material.

9. Machine as claimed in claim 1, characterized in that the machine also comprises fifth means (10) for splicing the tyre material.

10. Method for manufacturing a component of a car tyre, comprising of arranging a tyre material (5) round first means (4) provided for this purpose, wherein the method also comprises of causing the first means to change form in controlled manner between a first form and a second form, wherein change takes place between a first form (4A) with a substantially cylindrical periphery and a second form (4B) having a substantially cylindrical periphery with a flattened portion characterized in that the first means (4) comprise a plurality of radially adjustable elements (6), wherein change between the first and the second form takes place at least partially by radially adjusting and adjusting relative to each other the positions of a plurality of elements (6) provided for this purpose, which elements form part of the first means.

11. Method as claimed in claim 10, characterized in that the method also comprises of holding and transporting the tyre material to the first means by means of second means provided for this purpose.

12. Method as claimed in claim 11, characterized in that an applied under pressure is used for holding purposes.

13. Method as claimed in claim 10, characterized in that the method also comprises of holding the tyre material on the first means by means of third means provided for this purpose.

14. Method as claimed in claim 13, characterized in that an applied underpressure is used for holding purposes.

15. Method as claimed in claim 10, characterized in that the method also comprises of cutting the tyre material by means of fourth means provided for this purpose.

16. Method as claimed in claim 10, characterized in that the method also comprises of splicing the tyre material by means of fifth means (10) provided for this purpose.

* * * * *